May 20, 1941.  T. W. ROLPH  2,242,872
LUMINAIRE
Filed July 8, 1939
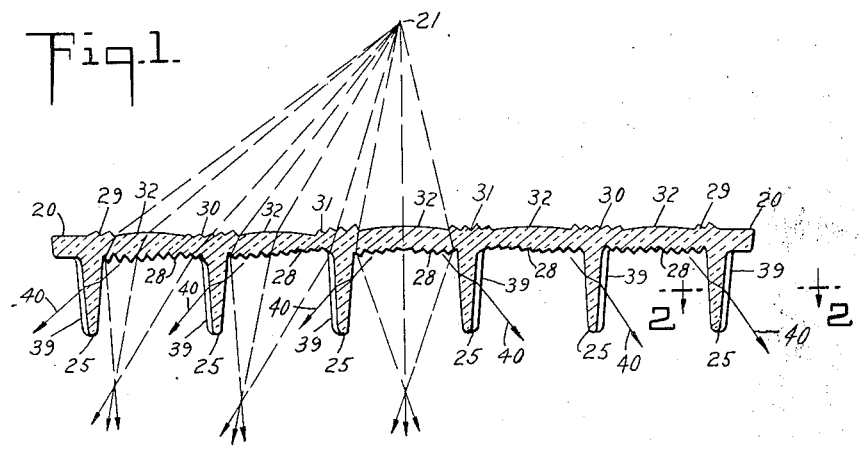
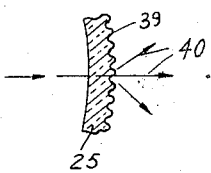
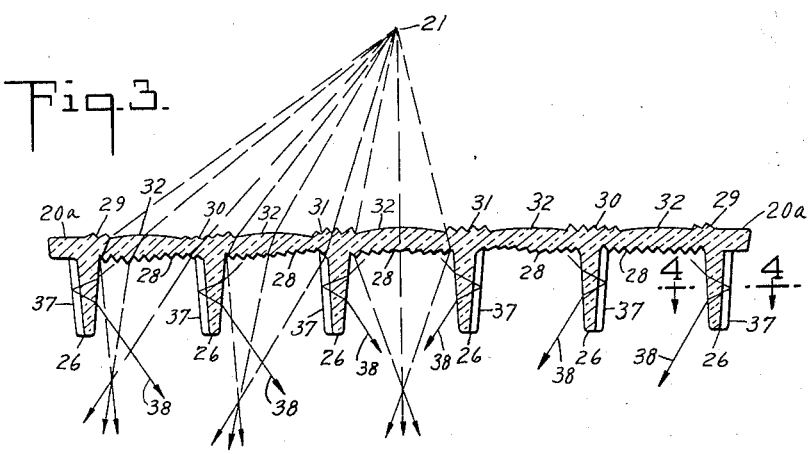
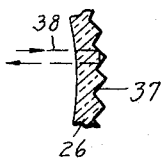
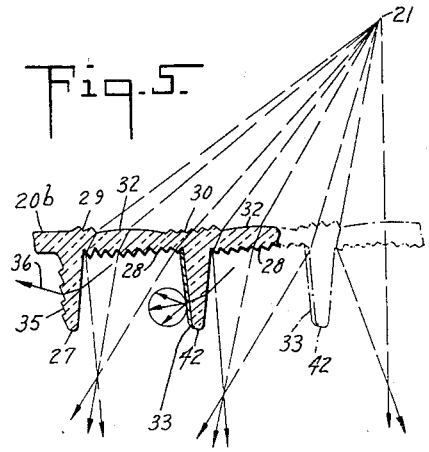
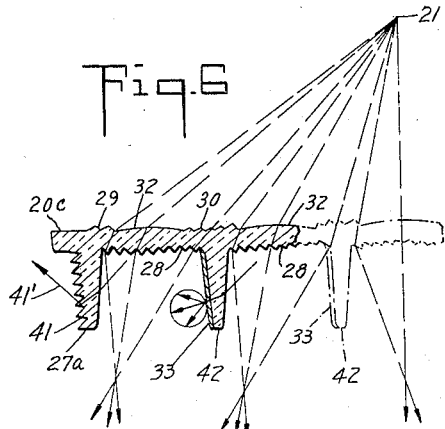
INVENTOR
THOMAS W. ROLPH
BY
ATTORNEY Patented May 20, 1941

2,242,872

UNITED STATES PATENT OFFICE 2,242,872

LUMINAIRE

Thomas W. Rolph, Newark, Ohio, assignor to Holophane Company, Inc., New York, N. Y., a corporation of Delaware Application July 8, 1939, Serial No. 283,329

5 Claims. (Cl. 240—78)

The present invention relates to luminaires, and is more particularly directed toward luminaires having prismatic light transmitting plates with integral louvers on the light emergent side of the plate which intercept stray light at glare-producing angles and modify it so as to screen the bright surfaces of the plate from observation.

When substantially flat pressed glass lenses or plates are given a prismatic configuration to reduce the divergence of the incident light and transmit it with controlled spread in desired directions, the emission of stray light at wide angles from the beam axis is unavoidable, and this produces regions of apparently comparatively high brightness on the surface of the lens when viewed from certain angles.

The present invention contemplates the provision of such lenses or plates with integral light modifying louvers to intercept this stray light and provide a surface in the line of vision of lower and more uniform brightness than that of the unshielded lens. These louvers may be formed in the same pressing operation employed in making the lens or plate.

The present invention may be readily adapted for use with point light sources with round and square lenses, or with long light sources with long lenses. The louvers may therefore be annular, radial, elliptical, rectilinear or crossed to form an egg crate. The light modifying action may be obtained by providing the louvers with diffusing means either in the form of etching, clear or colored enamelling, or light diffusing flutes, or they may be provided with reflecting or refracting prisms arranged to deviate the light away from the line of vision. These are generally placed on the light emergent side of the louver.

The accompanying drawing shows, for purposes of illustrating the present invention, several embodiments in which the invention may take form, it being understood that the drawing is illustrative of the invention rather than limiting the same.

In this drawing:

Figure 1 is a cross sectional view through a light transmitting plate and light source illustrating the use of light modifying means in the form of vertical ribs of a light diffusing nature;

Figure 2 is a fragmentary cross sectional view on the line 2—2 of Figure 1;

Figure 3 is a view similar to Figure 1 wherein the vertical ribs for light modification are totally reflecting prisms;

Figure 4 is a fragmentary cross sectional view on the line 4—4 of Figure 3; and

Figures 5 and 6 are views similar to Figure 1 wherein the light modifying means on the outer louvers take the form of horizontal prisms which may be refracting as in Figure 5 or reflecting as in Figure 6.

In Figure 1 the prismatic plate 20 is shown flat, but it may be slightly dished. It is generally mounted horizontal and may be annular, square or elongated depending upon the type of opening in which it is to be used as well as the type of light source. The light source is indicated at 21. The plate is here shown as having on the lower or light emergent side a number of vertical, integral louvers 25. Between adjacent louvers the plate has a prism construction such as indicated at 28 designed to reduce the angle of divergence of the emitted light beam. The light incident or upper side of the plate has, as here shown, opposite the louvers a number of prisms 29, 30, 31 which in each case act on the incident rays to deviate the rays away from the opposite louver. Opposite the prisms 28 the plate may be convex, as indicated at 32. With this prismatic arrangement the light rays are emitted in a beam generally downward but somewhat divergent and the dominant light is kept off of the louvers. Some of the light, however, is emitted as stray light at high angles below the horizontal and would normally reach the eye and produce glare.

The louvers 25 are provided with light modifying means in the form of vertical ribs 39 which, as shown in Figures 1 and 2, transmit and diffusively scatter a ray 40 of stray light.

The plate 20a of Figures 3 and 4 may be the same as the plate 20 of Figures 1 and 2, except that here the louvers 26 have vertical ribs 37 which are totally reflecting prisms. They are disposed on the face of the louver remote from the lens axis as the reflection is internal. They return the ray 38 as indicated.

The plate 20b of Figure 5 has an outer louver 27 provided with horizontal prisms 35 which refract the ray 36 so that it is emitted at higher angles as indicated. The plate 20c of Figure 6 has an outer louver 27a provided with horizontal prisms 41 which reflect the ray 41' so that it is emitted upwardly as indicated. The inner louvers 42 of Figures 5 and 6 may be etched or have a coating of diffusing enamel 33 or have the vertical rib form of light modifying means.

It will be understood that the diffusing flutes 39 or the etching or coating 33 may be applied to the light incident or emergent sides of the louvers or to both sides of the louvers. The prismatic configurations of Figures 5 and 6 would ordinarily require the use of split molds and hence these means for effecting light modification in the louvers are better adapted for the outside surface of the outer louver.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. The combination with a light source of a light transmitting plate which in transverse section is provided with integral louvers on the light emergent side thereof, the plate having light concentrating prisms which transmit the dominant light between the louvers and in directions to avoid the louvers and emit stray light in directions to fall on the louvers, the louvers having light modifying means.

2. The combination of claim 1 wherein the light incident side of the plate has light deviating prisms above the bases of the louvers to keep the light in the plate from entering the louvers.

3. The combination of claim 1 wherein the louvers are light diffusing.

4. The combination of claim 1 wherein the louvers have vertical ribs for light modification.

5. The combination of claim 1 wherein the light modifying means comprises horizontal prisms for deviating light upwardly.

THOMAS W. ROLPH.